United States Patent
Chen (10) Patent No.: US 7,491,449 B2
(45) Date of Patent: Feb. 17, 2009

(54) COPPER-SILVER ALLOY WIRE AND METHOD FOR MANUFACTURING THE SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 63 days.

(21) Appl. No.: 11/309,756

(22) Filed: Sep. 22, 2006

(65) Prior Publication Data

US 2007/0202349 A1     Aug. 30, 2007

(30) Foreign Application Priority Data

Feb. 24, 2006    (CN)  .................. 2006 1 0033953

(51) Int. Cl.
*B32B 15/02* (2006.01)
*B32B 15/20* (2006.01)
*C21D 9/52* (2006.01)
*C22F 1/08* (2006.01)

(52) U.S. Cl. .............. 428/607; 428/673; 428/675; 148/525

(58) Field of Classification Search ............ None
See application file for complete search history.

(56) References Cited

U.S. PATENT DOCUMENTS

| | | | | |
|---|---|---|---|---|
| 1,810,499 A | * | 6/1931 | Romp | 336/222 |
| 2,892,175 A | * | 6/1959 | Frey | 439/488 |
| 2,947,069 A | * | 8/1960 | Carlson et al. | 428/629 |
| 3,384,958 A | * | 5/1968 | Christian et al. | 29/829 |
| 4,205,984 A | * | 6/1980 | Smith et al. | 148/433 |
| 4,367,451 A | * | 1/1983 | Panaro | 337/160 |
| 4,756,467 A | * | 7/1988 | Schatzberg | 228/208 |
| 5,830,583 A | | 11/1998 | Clouser et al. | |
| 5,861,324 A | * | 1/1999 | Ichinose et al. | 438/119 |
| 2002/0066503 A1 | * | 6/2002 | Matsui et al. | 148/432 |
| 2004/0231882 A1 | * | 11/2004 | Hattori | 174/106 R |

(Continued)

FOREIGN PATENT DOCUMENTS

JP     50-60792    *   5/1975

(Continued)

OTHER PUBLICATIONS

English language translation of JP 01-122514, Apr. 2008, 10 pages.*

(Continued)

*Primary Examiner*—John J Zimmerman
(74) *Attorney, Agent, or Firm*—Andrew C. Cheng (57) ABSTRACT

An exemplary copper-silver alloy wire includes a conductive core containing copper, and a copper-silver cladding layer surrounding the conductive core. A ratio of silver to copper by weight in the copper-silver cladding layer is in a range from 1% to 30%. An exemplary method for manufacturing the copper-silver alloy wire includes steps of: providing a conductive core containing copper; forming a silver layer surrounding the conductive core; and heating the silver layer and peripheral portions of the conductive core so as to form a copper-silver cladding layer at an interface between the silver layer and the conductive core. The copper-silver alloy wire has high electrical conductivity, low current loss and high anti-interference.

14 Claims, 7 Drawing Sheets

U.S. PATENT DOCUMENTS

2007/0190881 A1 * 8/2007 Shibaoka et al. ............ 442/228

FOREIGN PATENT DOCUMENTS

| JP | 58-001089 | * | 1/1983 |
| JP | 59-205106 | * | 11/1984 |
| JP | 62-164899 | * | 7/1987 |
| JP | 01-122514 | * | 5/1989 |
| JP | 03-044454 | * | 2/1991 |
| JP | 04-066695 | * | 3/1992 |
| JP | 10-056190 | * | 2/1998 |
| JP | 11-092805 | * | 4/1999 |

OTHER PUBLICATIONS

Translation of JP 50-60792. no date.*
Translation of JP 01-122514. no date.*

* cited by examiner

COPPER-SILVER ALLOY WIRE AND METHOD FOR MANUFACTURING THE SAME

TECHNICAL FIELD

The present invention generally relates to alloy wires and, more particularly relates to a copper-silver alloy wire and a method for manufacturing the same.

BACKGROUND

Wires and cables are very important for diversified electrical appliances to input or output electrical power and data signals. Therefore, it is necessary for wires and cables to have high electrical conductivity, low current loss and high anti-interference.

In order to enhance the electrical conductivity of wires and cables, materials with high electrical conductivity such as pure copper and pure silver are used as a conductive core. However, not only are pure copper and pure silver fairly soft materials, but also it is very difficult to refine them, thus their use leads to a considerable increase in cost. Therefore, it has been believed for a long time that copper-based alloys such as brass are better for use as conductive core material for wires and cables, brass being an alloy of copper and zinc.

Brass, however, does have some draw-backs when used in wires and cables. Firstly, the electrical conductivity of a brass core is relatively low compared to other conducting metals, as a result wires and cables made from brass exhibit relatively high levels of eddy current loss. Eddy current is caused by self inductance in the conductor core when carrying current. Moreover, eddy current loss can increase with increasing diameter of wires and cables. Wires and cables with brass cores suffer from relatively high levels of interference, which can affect transmission of high frequency signals.

What is needed, therefore, is a wire with copper-silver alloy core having high electrical conductivity, low current loss and high anti-interference. What is also needed, therefore, is a method for manufacturing the wire.

SUMMARY

One preferred embodiment provides a copper-silver alloy wire. The copper-silver alloy wire includes a conductive core containing copper, and a copper-silver cladding layer surrounding the conductive core. A ratio of silver to copper by weight in the copper-silver cladding layer is in a range from 1% to 30%.

Another preferred embodiment provides a method for manufacturing a copper-silver alloy wire including steps of: providing a conductive core containing copper; forming a silver layer surrounding the conductive core; and heating the silver layer and peripheral portions of the conductive core so as to form a copper-silver cladding layer at an interface between the silver layer and the conductive core.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION OF PREFERRED EMBODIMENTS

Embodiments will now be described in detail below and with reference to the drawings.

Figure 1:
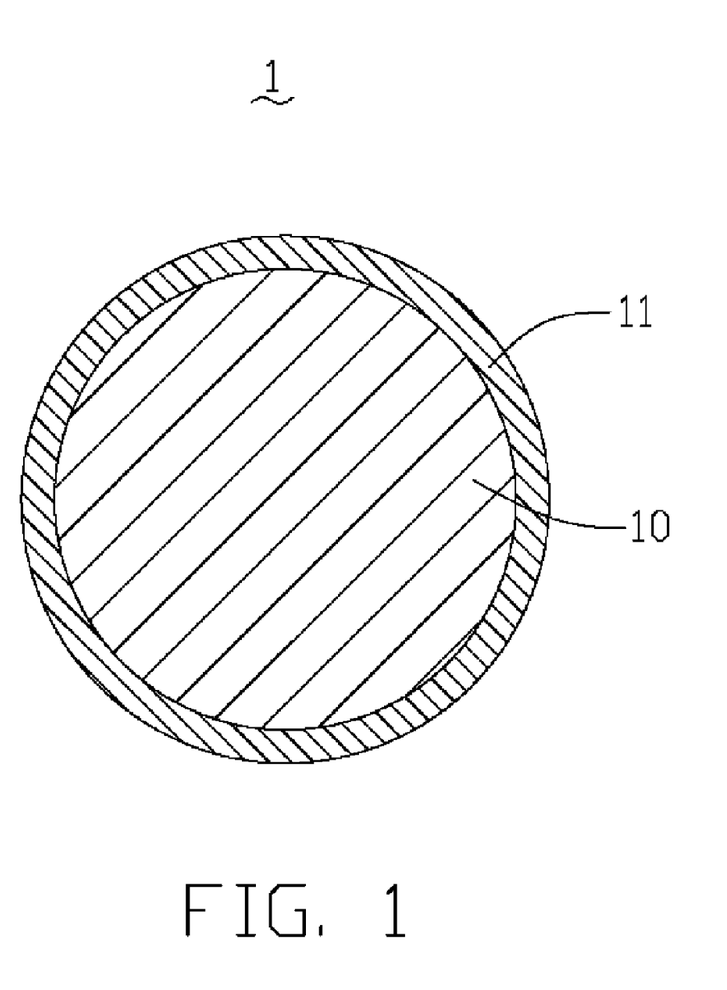
FIG. 1 is a schematic view, cross-sectional of a copper-silver alloy wire according to a first embodiment.

Referring to FIG. 1, a copper-silver alloy wire 1 according to a first exemplary embodiment is shown. The copper-silver alloy wire 1 includes a conductive core 10 and a copper-silver cladding layer 11 surrounding the conductive core 10.

The conductive core 10 forms an inner core of the copper-silver alloy wire 1. The conductive core 10 can be made of copper or copper-based alloy such as brass. Brass in the conductive core 10 can be a copper-zinc alloy containing approximately 28%~41% by weight of zinc, and preferably about 30% by weight of zinc.

The copper-silver cladding layer 11 is formed directly on the conductive core 10. A ratio of silver to copper by weight in the copper-silver cladding layer 11 is in a range from 1% to 30%. The properties of copper-silver cladding layer 11 relate to the ratio of silver to copper by weight thereof. When the ratio of silver to copper by weight in the copper-silver cladding layer 11 is more than 1%, the copper-silver alloy wire 1 can exhibit excellent electrical conductivity. However, if the ratio of silver to copper by weight in the copper-silver cladding layer 11 is more than 30%, hardness and strength of the copper-silver alloy wire 1 will decrease, thereby affecting its application and increasing cost greatly. Therefore, advantageously the ratio of silver to copper by weight in the copper-silver cladding layer 11 is in a range from 1% to 10%.

Figure 2:
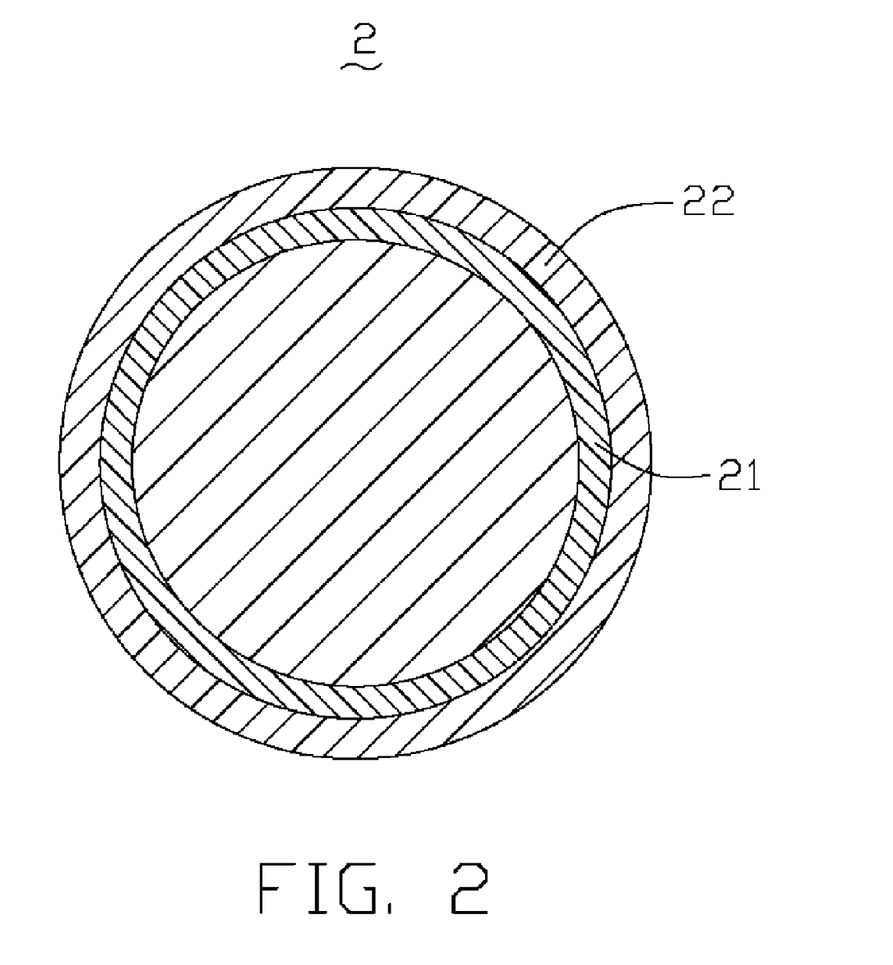
FIG. 2 is a schematic view, cross-sectional of a copper-silver alloy wire according to a second embodiment.

Referring to FIG. 2, a copper-silver alloy wire 2 according to a second exemplary embodiment is shown. The copper-silver alloy wire 2 is similar to the copper-silver alloy wire 1 in the first exemplary embodiment. Otherwise the copper-silver alloy wire 2 includes a conductive core 20, a copper-silver cladding layer 21 surrounding the conductive core 10 and a silver layer 22 surrounding the copper-silver cladding layer 21. The additional silver layer 22 contains silver and other possible impurities.

Figure 3:
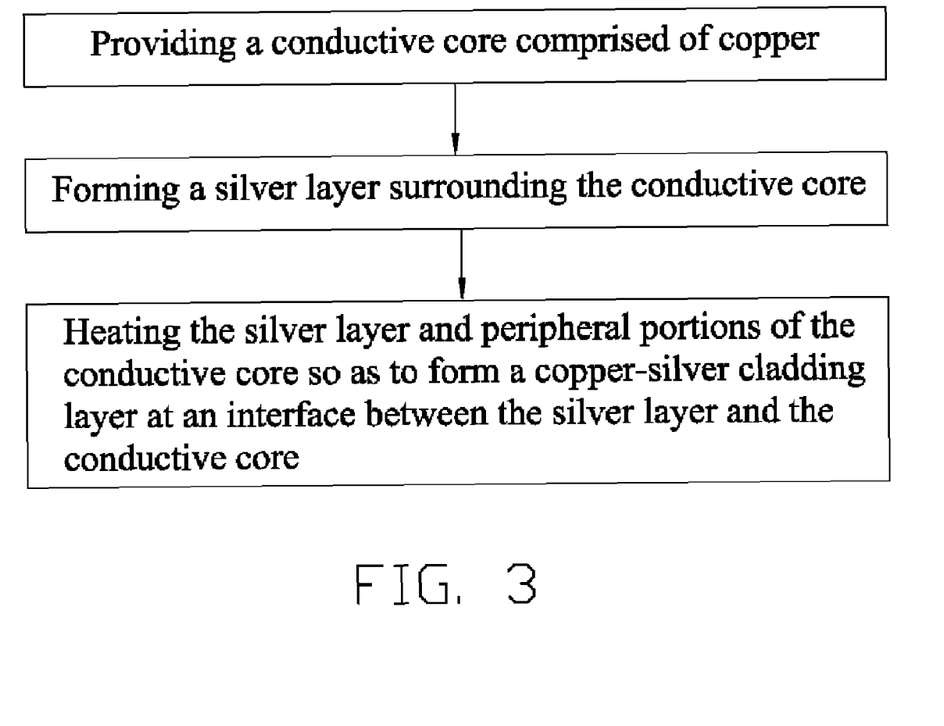
FIG. 3 is a flow chart of a method for manufacturing a copper-silver alloy wire according to a preferred embodiment.

Referring to FIG. 3, a method for manufacturing the copper-silver alloy wire 1 according to a preferred embodiment is shown. The method includes steps of:

step 1: providing a conductive core 10 containing copper;

step 2: forming a silver layer 13 surrounding the conductive core 10; and step 3: heating the silver layer 13 and peripheral portions of the conductive core 10 so as to form a copper-silver cladding layer 111 at an interface 14 between the silver layer 13 and the conductive core 10.

The following embodiment is provided to describe the method for manufacturing the copper-silver alloy wire 1 in detail.

The conductive core 10 can be made of copper or copper-based alloy such as brass. The conductive core 10 forms an inner core of the copper-silver alloy wire 1. In the exemplary embodiment, the conductive core 10 is copper core.

Figure 4:
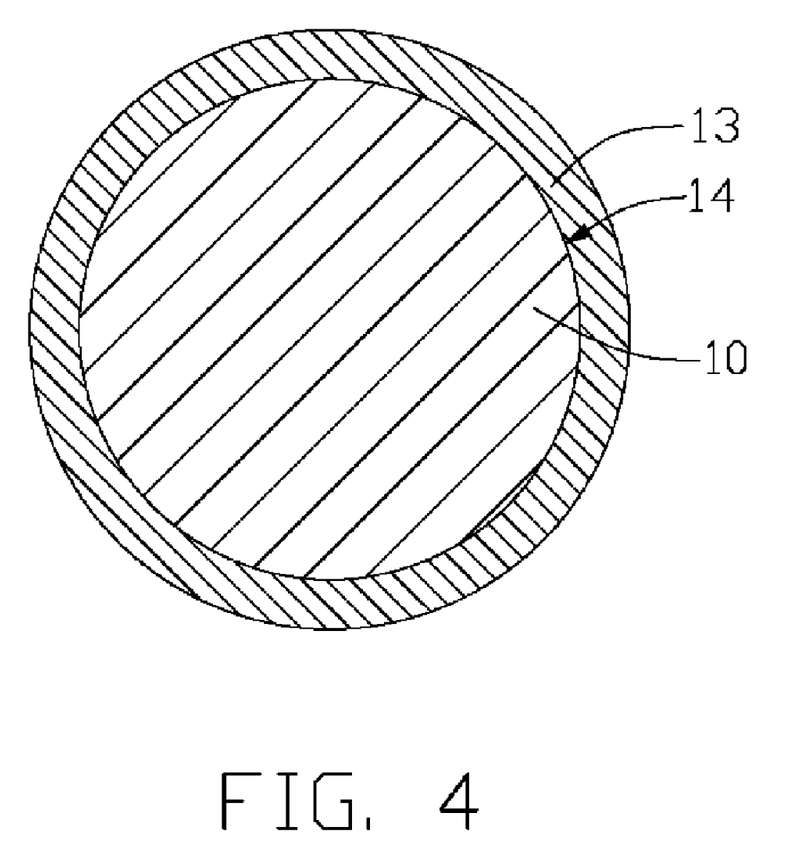
FIG. 4 is a schematic view, cross-sectional of a conductive core with a silver layer according to a preferred embodiment.

Referring to FIG. 4, in the step of forming the silver layer 13 on the conductive core 10, a thickness of the silver layer 13 can be determined according to the ratio of silver to copper by weight in the copper-silver cladding layer 111. The silver layer 13 can be formed outside around the conductive core 10 using electroplating or sputtering processes such as direct current (DC) sputtering, alternating current (AC) sputtering, and radio frequency (RF) sputtering. Once the silver layer 13 is formed, an interface 14 between the conductive core 10 and the silver layer 13 can be defined. At the interface 14, peripheral portions of the conductive core 10 are adjacent to the silver layer 13.

Figure 5:
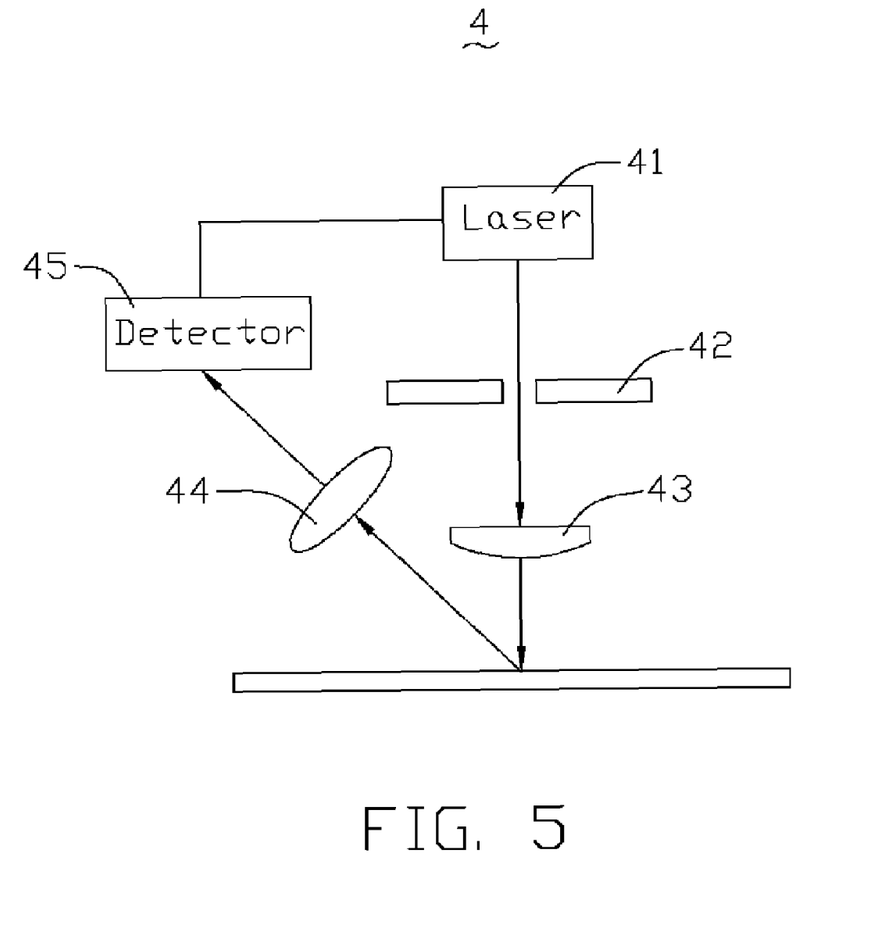
FIG. 5 is a schematic view of a laser treatment system for manufacturing a copper-silver alloy wire according to the preferred embodiment.

In the step of forming a copper-silver cladding layer 11, a laser treatment system 4 can be used to heat the silver layer 13 and peripheral portions of the conductive core 10 adjacent to the silver layer 13. The melting mixture of silver and copper heated by laser can undergo a phase transition to form the copper-silver cladding layer 11. During the laser treating process, the conductive core 10 can be moved along axial direction thereof. Meanwhile, the conductive core 10 can be stretched and twisted so as to uniformly heat the whole conductive core 10 using lasers. Thus the copper-silver cladding layer 11 can be formed surrounding the conductive core 10 integrally and uniformly.

Referring to FIG. 5, the laser treatment system 4 for manufacturing the copper-silver alloy wire 1 is shown. The laser treatment system 4 includes a laser 41, a blocking shutter 42, a focusing device 43, a controller 44 and a detector 45.

The laser 41 can be a diode-pumped-solid-state-laser such as Nd:YAG (neodymium-doped yttrium aluminium garnet) laser and Nd:YVO4 (neodymium-doped yttrium orthovanadate) laser. Nd:YAG laser or Nd:YVO4 laser typically emits light with a wavelength of 1064 nanometers in the infrared. Additionally, a diode-pumped-solid-state-laser with frequency-doubler also can be used as the laser 41. Thus since the velocity remains constant when the diode-pumped-solid-state-laser is used with a frequency doubler the wavelength is cut in half, therefore an Nd:YAG laser or Nd:YVO4 laser used with a frequency-doubler emits light with a wavelength of 532 nanometers. Shorter wavelength lasers can give better accuracy and resolution on the alloy temperature profiles. The blocking shutter 42 and the focusing device 43 is configured for focusing the laser emitted from the laser 41. A smooth copper-silver layer 11 can be gained by adjusting the spot size and depth of focus. The controller 44 is configured for controlling process parameters of laser treatment such as pulse energy, pulse duration, pulse frequency and temperature. Lower surface roughness can be gained by optimizing the above process parameters using the controller 44. The controller 44 is also configured for controlling the temperature during the laser treating process. Using the controller 44, the laser treatment can be performed in a desired temperature range and the phase transition process occurs with decreasing of temperature. The detector 45 is configured for detecting the surface profile for feedback loop control, thus information about heating the silver layer 13 and peripheral portions of the conductive core 10 adjacent to the silver layer 13 and alloying silver and copper can be obtained.

Figure 6:
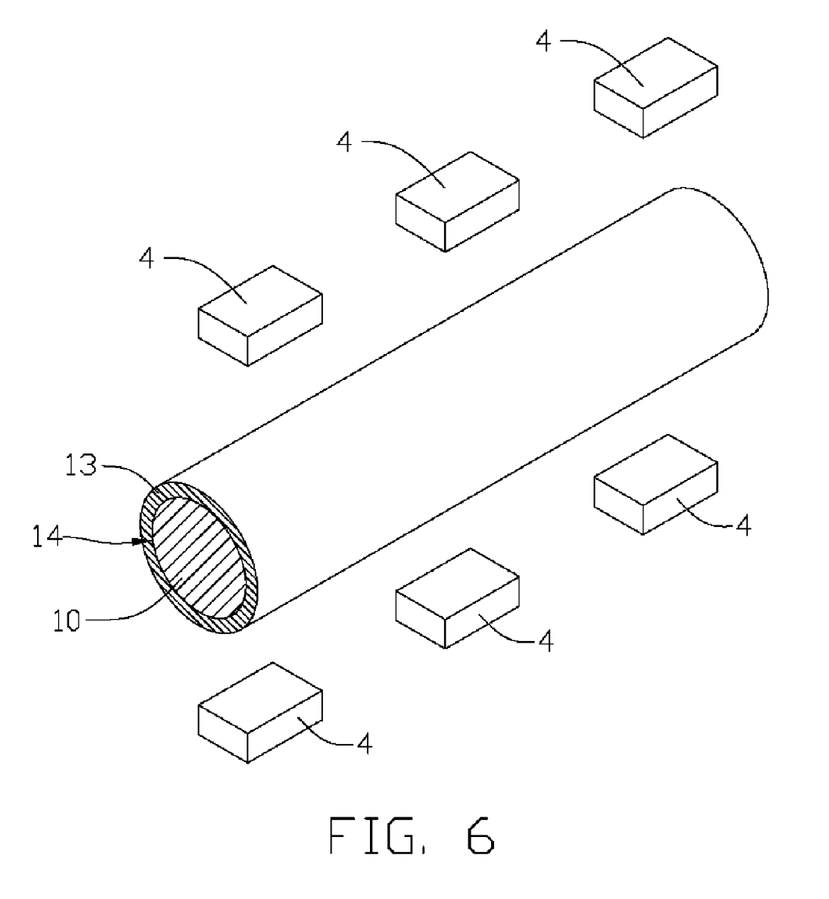
FIG. 6 is a schematic view of multiple laser treatment systems for manufacturing a copper-silver alloy wire according to the preferred embodiment.

Multiple laser treatment systems 4 can be used to alloy copper and silver at the interface 14 between the conductive core 10 and the silver layer 13 during the laser treating process. Referring to FIG. 6, a number of pairs of laser treatment systems 4 can be disposed along axial direction of the conductive core 10 for forming the copper-silver cladding layer 11. Because the conductive core 10 can be moved along axial direction thereof and can be stretched and twisted, the copper-silver cladding layer 11 can be formed surrounding the whole conductive core 10 integrally and uniformly. Each pair of laser treatment systems 4 can be disposed with one above and one below the conductive core 10. In the embodiment, three pairs of laser treatment systems 4 are used.

During the laser treating process, lasers emitted from multiple laser treatment systems 4 act on the silver layer 13, thus the silver layer 13 and peripheral portions of the conductive core 10 adjacent to the silver layer 13 can be melted. A heating temperature is the higher melting point of silver and the conductive core 10. In the embodiment, because the melting point of silver is lower than that of the conductive core 10, the heating temperature is equal to melting point of the conductive core 10. Lasers have high energy density so the silver layer 13 and peripheral portions of the conductive core 10 adjacent to the silver layer 13 can be melted in a short time. Meanwhile, heat transmitted by heat conduction is not enough to melt the middle portion of the conductive core 10. Therefore, a melting liquid mixture of silver and copper can be formed surrounding the middle portion of the conductive core 10.

With decreasing temperature the melting liquid mixture of silver and copper can undergo a phase transition to form the copper-silver cladding layer 11 surrounding the conductive core 10.

Figure 7:
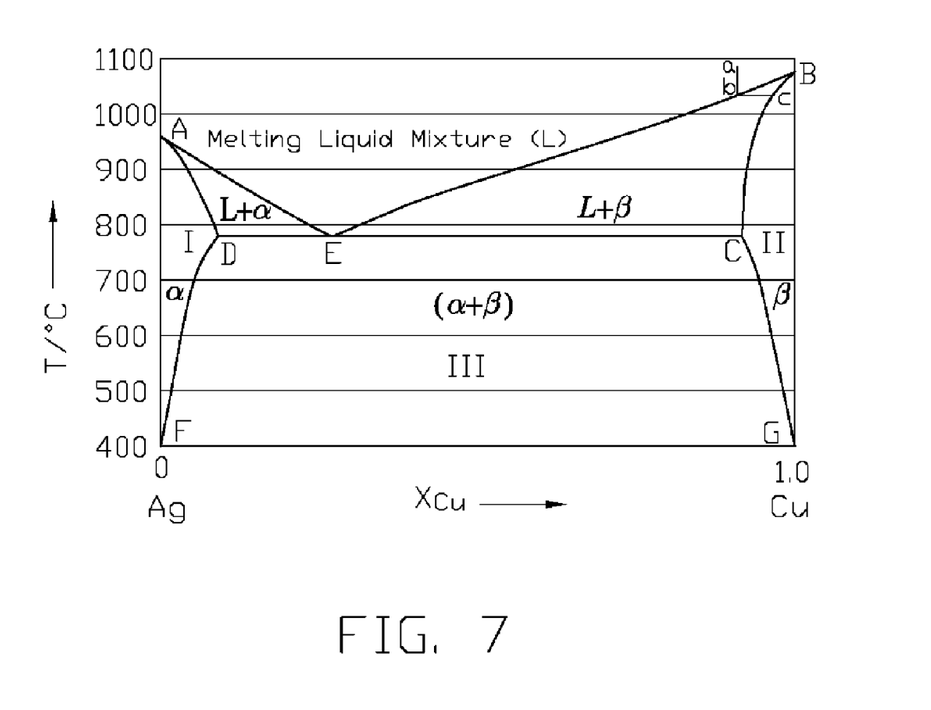
FIG. 7 is a typical copper-silver alloy phase diagram.

Referring to FIG. 7, the Y-axis is temperature and the X-axis is percentage of composition by weight, the far left side being 100% by weight of silver, the far right side being 100% by weight of copper. The melting point of silver (marked A) is 960 degrees Celsius and the melting point of copper (marked B) is 1080 degrees Celsius. At all temperatures above the liquid line (AEB line), any combination of silver and copper is liquid. The phase diagram also identifies where the solid of any combination of silver and copper exits as one or two phases. Alpha phase (α) solid solution is the silver-rich phase and beta phase (β) solid solution is the copper-rich phase. The area marked □ is where the solid exists as alpha phase solid solution. The area marked □ is where the solid exists as beta phase solid solution. The area marked □ is where the solid exists as both alpha phase and beta phase solid solution. Two areas between the solid line (DEC line) and liquid line indicate where the liquid is in equilibrium with either the alpha phase or beta phase solid solution. This diagram also identifies a eutectic point E, where a copper-silver eutectic compound solidifies at a constant temperature. The eutectic point of copper and silver is at 780 degrees Celsius. The copper-silver eutectic compound contains 28% by weight of copper and 72% by weight of silver.

For example, the silver layer 13 and peripheral portions of the conductive core 10 adjacent to the silver layer 13 can form a melting liquid mixture of copper and silver with temperature of 1080 degrees Celsius using laser treatment. The melting liquid mixture of copper and silver is a single-phase system containing 10% by weight of silver, which is marked with a on the diagram. When temperature is reduced to b, the melting liquid mixture begins to form beta phase solid solution, which is marked with c on the diagram. During further cooling process, beta phase solid solution can transform along cC line and remainder melting liquid mixture can transform along bE line. When temperature arrives to the eutectic point, the melting liquid mixture begins to form alpha phase solid solution. Then alpha phase solid solution can transform along DF line and beta phase solid solution can transform along CG line. The result is grains of both alpha phase and beta phase combined in copper-silver cladding layer 11 in the microstructure. In the embodiment, the alpha phase contains about 9% by weight of copper and the beta phase contains about 92% by weight of copper.

During the laser treating process, a gas such as nitrogen gas and inert gas can be used to prevent the copper undergoing oxidation. The inert gas can be argon and helium.

Preferably, the method for manufacturing the copper-silver alloy wire 1 further includes a step of annealing the copper-silver cladding layer 11. Annealing the copper-silver cladding layer 11 can release stress in the copper-silver cladding layer 11. Annealing can be performed in an annealing furnace at a temperature in a range from 300 degrees Celsius to 500 degrees Celsius and for a time period in a range from 0.5 hours to 20 hours.

A method for manufacturing a copper-silver alloy wire 2 is similar to the method for manufacturing a copper-silver alloy wire 1. Otherwise when the silver layer 13 is thicker, the melting silver cannot be mixed with copper adequately. Therefore, a copper-silver cladding layer 21 can be formed via phase transition only at the interface 14 between the silver layer 13 and the conductive core 10. Meanwhile, superfluous melting silver can form a silver layer 22 surrounding the copper-silver cladding layer 21.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A copper-silver alloy wire comprising:
   a conductive core comprised of copper, and
   a copper-silver cladding layer surrounding the conductive core, wherein the copper-silver cladding layer is comprised of alpha phase and beta phase copper-silver solid solution.

2. A method for manufacturing a copper-silver alloy wire, comprising the steps of:
   providing a conductive core comprised of copper;
   forming a silver layer surrounding the conductive core; and
   heating the silver layer and peripheral portions of the conductive care using a laser treating process so as to form a copper-silver cladding layer at an interface between the silver layer and the conductive core.

3. The method as claimed in claim 2, wherein the laser treating process is performed in a gas selected from a group consisting of nitrogen gas and inert gas.

4. The method as claimed in claim 2, wherein a laser used in the laser treating process is selected from a group consisting of an Nd:YAG laser and an Nd:YVO4laser.

5. The method as claimed in claim 2, wherein a plurality of lasers is employed to create the copper-silver cladding layer at the interface between the conductive core and the silver layer.

6. The method as claimed in claim 2, wherein the conductive core with the silver layer is stretched during the step of heating the silver layer.

7. The method as claimed in claim 2, wherein the conductive core with the silver layer is twisted during the step of heating the silver layer.

8. The method as claimed in claim 2, further comprising a step of annealing the copper-silver cladding layer.

9. A copper-silver alloy wire comprising:
   a conductive core comprised of copper; and
   a copper-silver cladding layer surrounding the conductive core;
   wherein a ratio of silver to copper by weight in the copper-silver cladding layer is in a range from 1% to 10%.

10. The copper-silver alloy wire as claimed in claim 9, further comprising a silver layer surrounding the copper-silver cladding layer.

11. The copper-silver alloy wire as claimed in claim 9, wherein the conductive core is comprised of a copper-based alloy.

12. The copper-silver alloy wile as claimed in claim 11, wherein the conductive core is comprised of brass.

13. The copper-silver alloy wire as claimed in claim 12, wherein a percentage by weight of zinc in the brass is in a range from 28% to 41%.

14. The copper-silver alloy wire as claimed in claim 9, wherein the copper-silver cladding layer is comprised of alpha phase and beta phase copper-silver solid solution.

* * * * *